US012584440B2

(12) United States Patent
Keuler et al.

(10) Patent No.: US 12,584,440 B2
(45) Date of Patent: Mar. 24, 2026

(54) TURBOCHARGER CONTROL SYSTEM FOR REDUCTION OF ROTATIONAL SPEED FLUCTUATION

(71) Applicant: Garrett Transportation I Inc, Torrance, CA (US)

(72) Inventors: Jens Keuler, Leonberg (DE); Daniel Terber, Prague (CZ); Joachim Ziegler, Stuttgart (DE)

(73) Assignee: Garrett Transportation I Inc., Torrance, CA (US)

(*) Notice: Subject to any disclaimer, the term of this patent is extended or adjusted under 35 U.S.C. 154(b) by 223 days.

(21) Appl. No.: 18/145,062

(22) Filed: Dec. 22, 2022

(65) Prior Publication Data

US 2024/0209868 A1 Jun. 27, 2024

(51) Int. Cl.

| | |
|---|---|
| ***F02B 39/10*** | (2006.01) |
| ***F02B 37/04*** | (2006.01) |
| ***F02B 37/12*** | (2006.01) |
| ***F02B 37/14*** | (2006.01) |
| ***F04B 49/06*** | (2006.01) |
| ***F04D 25/02*** | (2006.01) |
| ***F04D 25/06*** | (2006.01) |
| ***F04D 27/00*** | (2006.01) |
| ***F04D 29/66*** | (2006.01) |

(52) U.S. Cl.

CPC .............. *F02B 39/10* (2013.01); *F02B 37/04* (2013.01); *F02B 37/14* (2013.01); *F04B 49/065* (2013.01); *F04D 25/024* (2013.01); *F04D 25/06* (2013.01); *F04D 25/0673* (2013.01); *F04D 27/001* (2013.01); *F04D 27/004* (2013.01); *F04D 29/668* (2013.01); *F02B 2037/122* (2013.01)

(58) Field of Classification Search

CPC .... F04D 25/024; F04D 25/06; F04D 25/0673; F04D 27/004; F04D 49/065; F02B 37/04; F02B 37/10–14; F02B 39/10; F02B 2037/122

See application file for complete search history.

(56) References Cited

U.S. PATENT DOCUMENTS

| | | | | |
|---|---|---|---|---|
| 7,434,399 B2 * | 10/2008 | Ishiwatari | ........... | F02D 41/0007 60/602 |
| 7,805,939 B2 * | 10/2010 | Kimoto | .................. | F02B 37/14 60/609 |

(Continued)

FOREIGN PATENT DOCUMENTS

| | | | |
|---|---|---|---|
| CN | 110748409 A * | 2/2020 | ............. F02B 37/22 |
| CN | 113847149 A * | 12/2021 | |

(Continued)

*Primary Examiner* — Alexander B Comley
(74) *Attorney, Agent, or Firm* — BelayIP

(57) ABSTRACT

A turbocharger control system including a turbocharger having an exhaust turbine and a centrifugal compressor mechanically coupled by a shaft, a pressure sensor for detecting a boost pressure, an electric motor configured to apply a rotational pressure to the shaft in response to a current, and a processor determining an expected rotational speed in response to the boost pressure, determining a current value in response to a difference between the expected rotational speed and a desired rotational speed, and generating a control signal indicative of the current value to control the current applied to the electric motor.

10 Claims, 5 Drawing Sheets

100

(56) References Cited

U.S. PATENT DOCUMENTS

| | | | | |
|---|---|---|---|---|
| 2016/0215781 | A1* | 7/2016 | Okuda | F04D 25/024 |
| 2016/0333775 | A1* | 11/2016 | Kraemer | F02B 39/10 |
| 2017/0122339 | A1* | 5/2017 | Sun | F02B 37/14 |
| 2021/0102545 | A1* | 4/2021 | Weigand | F02B 37/10 |
| 2022/0316387 | A1* | 10/2022 | Blythe | F02G 5/02 |

FOREIGN PATENT DOCUMENTS

| | | | | |
|---|---|---|---|---|
| FR | 2995357 | A1 * | 3/2014 | B60W 10/06 |
| JP | 2014020364 | A * | 2/2014 | |

* cited by examiner

200

TURBOCHARGER CONTROL SYSTEM FOR REDUCTION OF ROTATIONAL SPEED FLUCTUATION

TECHNICAL FIELD

The present disclosure generally relates to an turbocharger system with an electric motor and, more particularly, relates to the use of an electric motor to power and dampen a turbocharger shaft between a turbine and a compressor to regulate rotational speed fluctuations.

BACKGROUND

Combustion engines require air, fuel and spark to perform. Typically, a combustion engine turns a crankshaft which is attached to pistons within cylinders. In response to the turning of the crankshaft, the pistons compress a mixture of fuel and air within the cylinder. This compressed mixture is then ignited with a spark which causes combustion and forces the piston down into the cylinder, thereby turning the crankshaft. The rotation of the crankshaft is used to turn a transmission which moves the vehicle. Higher compression within the cylinder before ignition results in better combustion efficiency with more power with less fuel, and fewer exhaust gases. In addition, increasing engine compression can be an effective way to achieve more horsepower.

Superchargers are one method used to increase combustion engine compression to improve fuel economy, reduce emissions, and increase horsepower. Superchargers use pumps to compress the intake air before it is introduced into the cylinder. One particular type of supercharger is a turbocharger which uses exhaust gases from the combustion engine to spin a turbine, such as a radial turbine. This turbine is mechanically coupled to a compressor, such as a centrifugal compressor which is used to compress the intake air for use by the compression engine.

To ensure the required air supply to the engine, it is desirable for turbochargers to run at a constant rotational speed. Rotational speed fluctuations can lead to bearing wear due to time variant thrust and radial load and can result in premature journal bearing failure. Turbo shaft rotational speed fluctuation can be observed when a turbocharger is applied on an internal combustion engine due to the discrete number of ignitions during a full engine rotation, especially on engines with 3 or even 2 cylinders. The lower the number of cylinders, the lower the number of discrete ignitions, and the greater the shaft speed fluctuation on the turbocharger. In addition, rotational speed variation may result in exhaust valve opening when the in-cylinder pressure is higher than the exhaust manifold pressure. Thus, it is desirable to reduce the rotational speed fluctuations of the turbocharger to increase operational efficiency and reduce premature bearing wear. Other desirable features and characteristics of the present disclosure will become apparent from the subsequent detailed description and the appended claims, taken in conjunction with the accompanying drawings and this background discussion.

BRIEF SUMMARY

In one embodiment, a turbocharger control system including a turbocharger having an exhaust turbine and a centrifugal compressor mechanically coupled by a shaft, a pressure sensor for detecting an exhaust pressure, an electric motor configured to apply a rotational pressure to the shaft in response to a current, and a processor determining an expected rotational speed in response to the exhaust pressure, determining a current value in response to a difference between the expected rotational speed and a desired rotational speed, and generating a control signal indicative of the current value to control the current applied to the electric motor In another embodiment, a method for controlling a turbocharger system to detect, with a pressure sensor, an exhaust pressure; determining a predicted turbocharger rotational speed in response to the exhaust pressure determine, by a processor, a current value in response to a difference between the predicted rotational speed and a desired turbocharger rotational speed; and apply, by a turbo controller, a current corresponding to the current value to an electric motor to generate a rotational force on a turbocharger shaft.

Moreover, a turbocharger control system including a pressure sensor for measuring an exhaust pressure, a rotational sensor for measuring a measured rotational speed of a turbocharger shaft, an electric motor configured to apply a rotational force to the turbocharger shaft and to apply a damping force to the turbocharger shaft in response to a control signal, and a processor operative to generate the control signal indicative of a current value in response to the exhaust pressure, the measured rotational speed, and a desired rotational speed.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
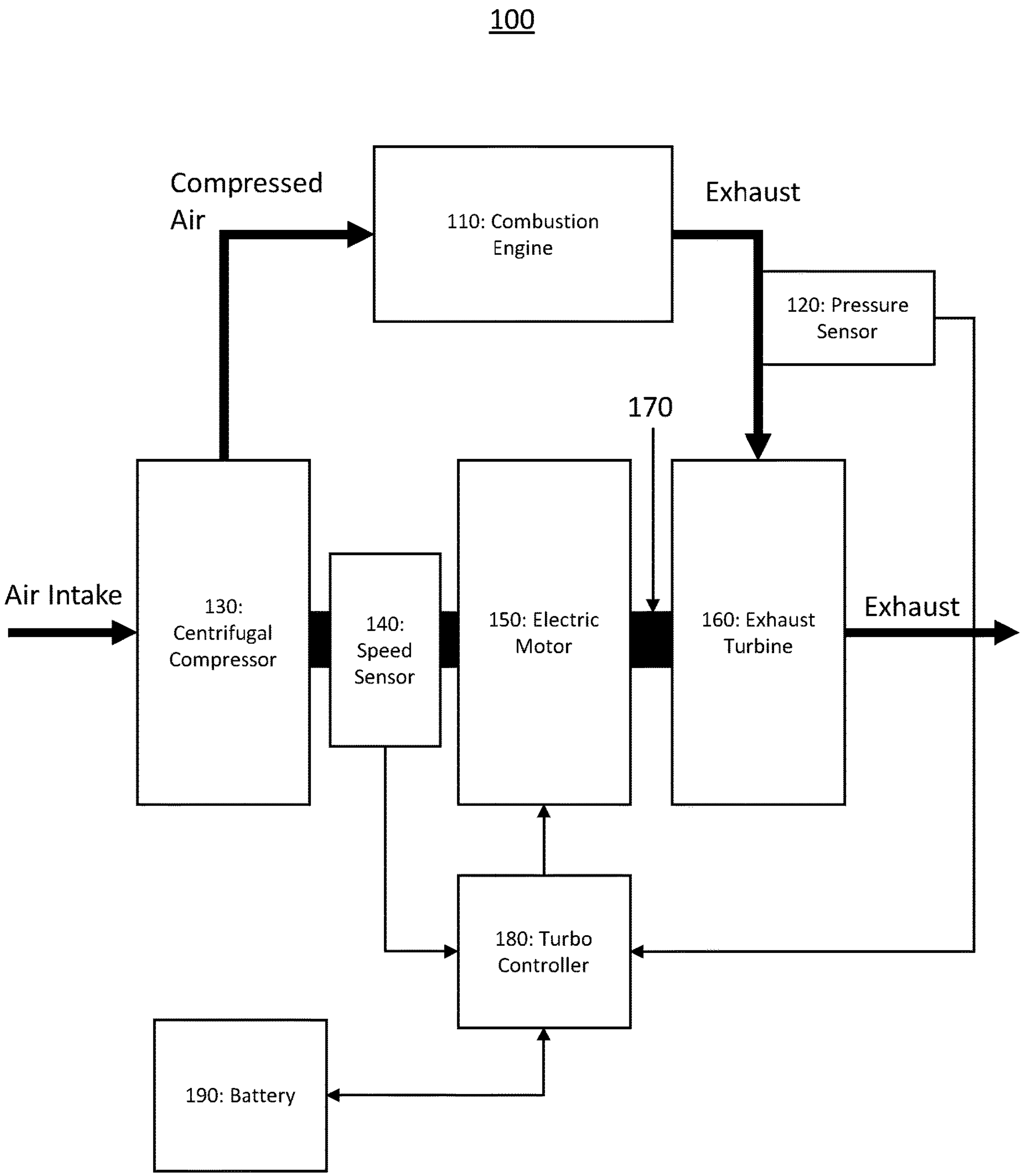
FIG. 1 illustrates an exemplary turbocharger configuration according to exemplary embodiments of the present disclosure.

Turning now to FIG. 1, an exemplary system 100 for reducing rotational speed variations in a turbocharger is shown. The exemplary system 100 includes a combustion engine 110, a pressure sensor 120, a centrifugal compressor 130, a rotational speed sensor 140, an electric motor 150, an exhaust turbine 160, a shaft 170, a turbo controller 180 and a battery 190.

Generally, the system 100 is operative to use exhaust gases produced by the combustion engine 110 to turn the exhaust turbine 160. The shaft 170 is coupled between the exhaust turbine 160 and the centrifugal compressor 130 such that rotation of the exhaust turbine 160 results in corresponding 1:1 rotation of the centrifugal compressor 130. The centrifugal compressor 130 is configured to intake air from the surrounding environment, typically through an air filter, and to compress this air to generate compressed air. This compressed air is then coupled to an intake of the combustion engine 110 in order to raise the compression of the air/fuel mixture being ignited to drive the combustion engine rotation.

A shortcoming of the traditional turbocharger configuration is turbo lag. Turbo lag results from the time between when the accelerator is depressed until sufficient pressure is built up in the exhaust system to spin the exhaust turbine 160 to generate the compressed intake air to provide to the combustion engine 110 in order to provide the extra compression, and power, to the engine. To address the turbo lag problem, electric motors 150 have been added to the turbocharger configuration to spin up the centrifugal compressor 160 immediately in response to the accelerator being depressed in order to more quickly supply the compressed intake air and minimize the effects of the turbo lag. The electric motor 150 can be directly coupled the shaft 170 to rotate the centrifugal compressor 130 and the exhaust turbine in response to an electric current applied to the electric motor 150. In some exemplary embodiments, the electric current may be supplied to the electric motor 150 from the battery 190 and is controlled by the turbo controller 180. Alternatively, the electric current may be supplied to a vehicle power supply network or the like.

Fluctuations in the rotational speed of a turbocharger may reduce the life expectancy of a turbocharger due to premature bearing wear. In addition, rotational speed fluctuations reduce turbo efficiency and thereby reduce fuel economy and engine power. To address these problems, the system 100 is configured to regulate the rotation of the shaft 170 using the electric motor 150. The electric motor 150 can be used to drive the shaft 170 to increase the rotational speed or to dampen the shaft to reduce the rotational speed. The electric motor 150 can drive the shaft 170 by applying a current to the electric motor 150 from the battery 190 in response to control signals generated by the turbo controller 180. Alternatively, the electric motor 150 can dampen the rotational speed of the shaft 170 by acting as a generator to extract rotational energy from the shaft 170 and generate a current which can be used to recharge the battery 190. In some exemplary embodiments, when and after an exhaust pulse hits the turbine in generation mode, the shaft speed will be stabilized.

In some exemplary embodiments, the system 100 may include a pressure sensor 120 to monitor the exhaust pressure output from the combustion engine 110 and a speed sensor 140 for monitoring the rotational speed of the shaft 170. In some exemplary embodiments, the speed sensor may include a magnet of the shaft of the stator of the turbocharger which can sense the change in voltage over the circumference of the stator and thereby be used to determine rotational speed. The turbo controller 180 may generate a control signal to control the electric motor 150 such that rotational or damping force is applied to the shaft in response to changes in the exhaust pressure detected by the pressure sensor 120 and/or changes in the rotational speed of the shaft 170 as detected by the rotational speed sensor 140. In some exemplary embodiments, the rotational speed sensor 140, electric motor 150 and the turbo controller 180 may be collocated in a common component.

In some exemplary embodiments, the turbo controller 180 can use machine learning algorithms to predict a rotational speed of the shaft 170 for a corresponding exhaust pressure detected by the pressure sensor 120. In addition, the machine learning algorithm may determine through machine learning training data, a required electric motor boost or damping of the shaft 170 rotation to result in a desired rotational speed for a detected exhaust pressure measured by the pressure sensor 120. The speed sensor 140 may monitor the resulting rotational speed of the shaft 170. If the resulting rotational speed deviates from the predicted rotational speed, this data may be used as additional training data for the machine learning algorithm. In some exemplary embodiments, the change in rotational speed may occur over a time duration as a result of the detected exhaust pressure. The turbo controller 180 can delay the application of the electric motor 150 to compensate for this variation over time. Ideally, the turbo controller 150 will control the electric motor 150 in response to the exhaust pressure detected by the pressure sensor 120 such that the rotational speed of the shaft 170 remains constant.

Figure 2:
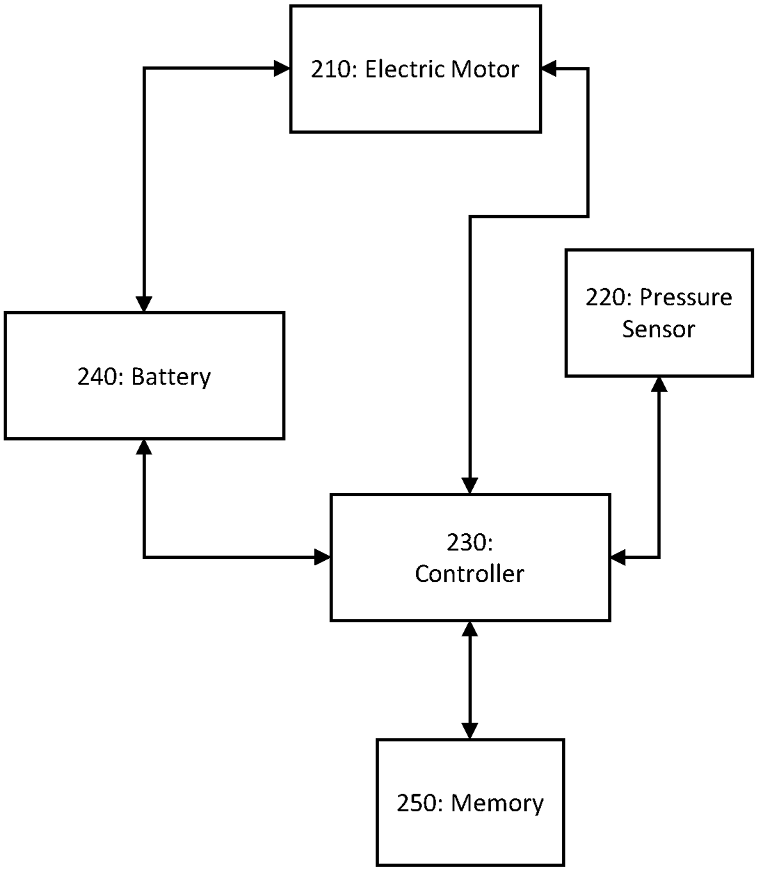
FIG. 2 illustrates an exemplary system for regulating a turbocharger rotational speed according to an exemplary embodiments of the present disclosure.

Referring now to FIG. 2, a system for regulating a turbocharger rotational speed according to an exemplary embodiments of the present disclosure is shown. The exemplary system 200 can include an electric motor 210, a pressure sensor 220, a controller 230, a battery 240, and a memory 250. The exemplary system 200 is operative to maintain a consistent rotational speed of a turbocharger assembly in compensation of fluctuating exhaust pressures detected from a combustion engine exhaust. This fluctuating exhaust pressure may be a result of a discrete number of combustion engine cylinder ignitions during a combustion engine rotational cycle, thereby generating deviations in pressure of exhaust gases applied to a turbocharger exhaust turbine. The lower the number of engine cylinders in the combustion engine, the lower the number of discrete ignitions and the greater the fluctuations in exhaust pressure.

The exemplary system 200 can utilize a pressure sensor 220 to detect a pressure of an exhaust gas from a combustion engine. Data indicative of the detected pressure is then coupled from the pressure sensor 220 to the controller 230. This detected pressure may then be used to estimate a turbocharger rotational speed. The turbo speed can be adjusted to achieve a desired intake manifold pressure. In some exemplary embodiments, a series of pressure detections may be made by the pressure sensor 220 at regular time intervals. This series of pressure detections can be coupled to the controller 230. In response, the controller 230 may generate a pressure curve for the exhaust pressure. This pressure curve may be used to predict a turbocharger rotational speed.

The controller 230 is configured to receive the data indicative of the exhaust pressure from the pressure sensor 220 to generate a control signal to control the rotational speed of the electric motor 210. The rotational speed of the electric motor 210 may be increased by applying a current to the electric motor such that the electric motor 210 applies a rotational force on the shaft of the turbocharger. In addition, the rotational speed of the electric motor 210 may be reduced by employing the electric motor 210 as a generator such that the shaft of the turbocharger applies a rotational force to the electric motor 210, such that the electric motor generates a current which can be coupled to the battery 240 to recharge the battery 240.

In some exemplary embodiments, data may be stored in a memory, such as a lookup table, a formula, or the like to determine the required current to be applied or extracted from the electric motor 210 in order to maintain the desired rotational speed of the turbocharger in light of the detected pressure of the combustion engine exhaust. In some exemplary embodiments, the data may be generated in response to a machine learning algorithm where various exhaust pressures are applied to a training system to determine the resulting rotational speed and the current required to maintain the desired rotational speed. The pressure curve may be used by the machine learning algorithm to predict the resulting rotational speed at a given time and a current curve can be generated by the machine learning algorithm to control the current applied to, or extracted from, the electric motor 210 such that the desired rotational speed of the turbocharger is maintained. If the predicted rotational speed deviates from the actual rotational speed after the calculated current level is applied to the electric motor 210, the actual rotational speed may be used for additional training input for the machine learning algorithm.

Figure 3:
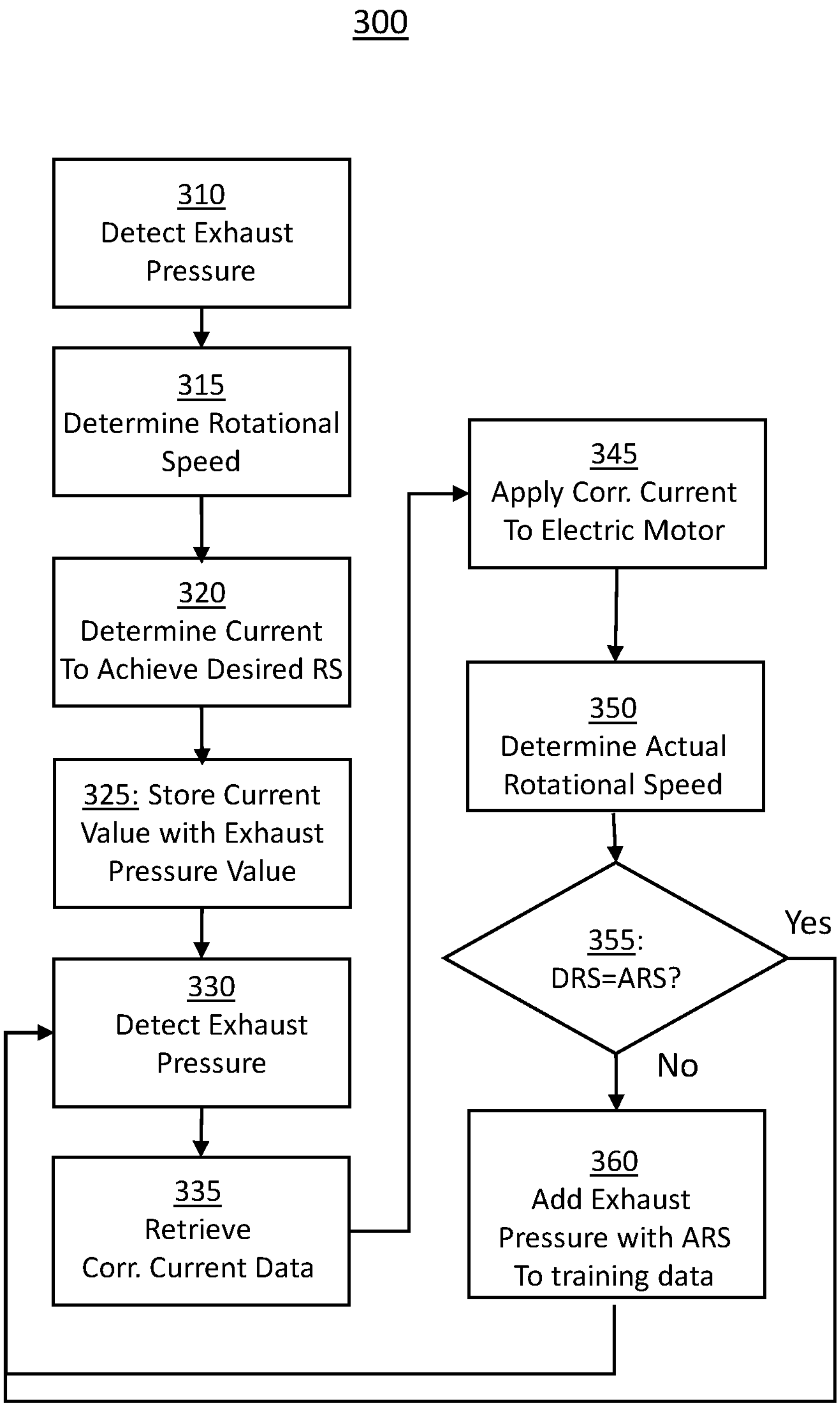
FIG. 3 illustrates an exemplary method for regulating a turbocharger rotational speed according to an exemplary embodiments of the present disclosure.

Turning now to FIG. 3, an exemplary method 300 for regulating a turbocharger rotational speed according to an exemplary embodiments of the present disclosure is shown. The exemplary method 300 is first operative in a machine learning training mode 310 to detect an exhaust pressure from a combustion engine employing a turbocharger. The exhaust pressure can be detected using a pressure sensor between the exhaust of the combustion engine and the exhaust turbine of the turbocharger. Alternatively, the exhaust pressure may be estimated in response to combustion engine revolutions per minute, coolant temperature and other engine parameters.

The rotational speed of the turbocharger is next determined 315 in the training mode by a rotational sensor. Next, a current value to be applied to the electric motor is determined 320 such that the desired rotational speed may be achieved. This current value may be calculated using parameters of the electric motor or may be determined experimentally. The current value may be a positive value to generate torque by the electric motor to be applied to the rotational shaft of the turbocharger to increase the rotational speed. Alternatively, the current value may be negative indicating that current is generated by the electric motor acting as a damping force to reduce the rotational speed on the rotational shaft of the turbocharger. The estimated and/or detected exhaust pressure and current value are stored in a memory. In addition, the rotational speed of the turbocharger at the exhaust pressure may also be stored with the current and pressure values.

In the operational mode, the exhaust pressure is detected 330 at the exhaust of a combustion engine. The method is next operative to retrieve 335 the current value from the memory corresponding to the exhaust pressure. A current corresponding to the current value is then applied 345 to the electric motor to increase the rotational speed of the turbocharger in response to a positive current value, or reduce the rotational speed of the turbocharger in response to a negative current value. In some exemplary embodiments, the method next determines 350 the actual rotational speed of the turbocharger after application of the current to the electric motor. The method compares 355 the desired rotational speed to the actual rotational speed. If the desired rotational speed is not equal to the actual rotational speed, the actual rotational speed, the current value and the exhaust pressure value are stored 360 to the memory as additional training data for the machine learning algorithm. The method continues to detect 330 a next exhaust pressure. If the desired rotational speed equals the actual rotational speed, the method continues to detect 330 a next exhaust pressure.

Figure 4:
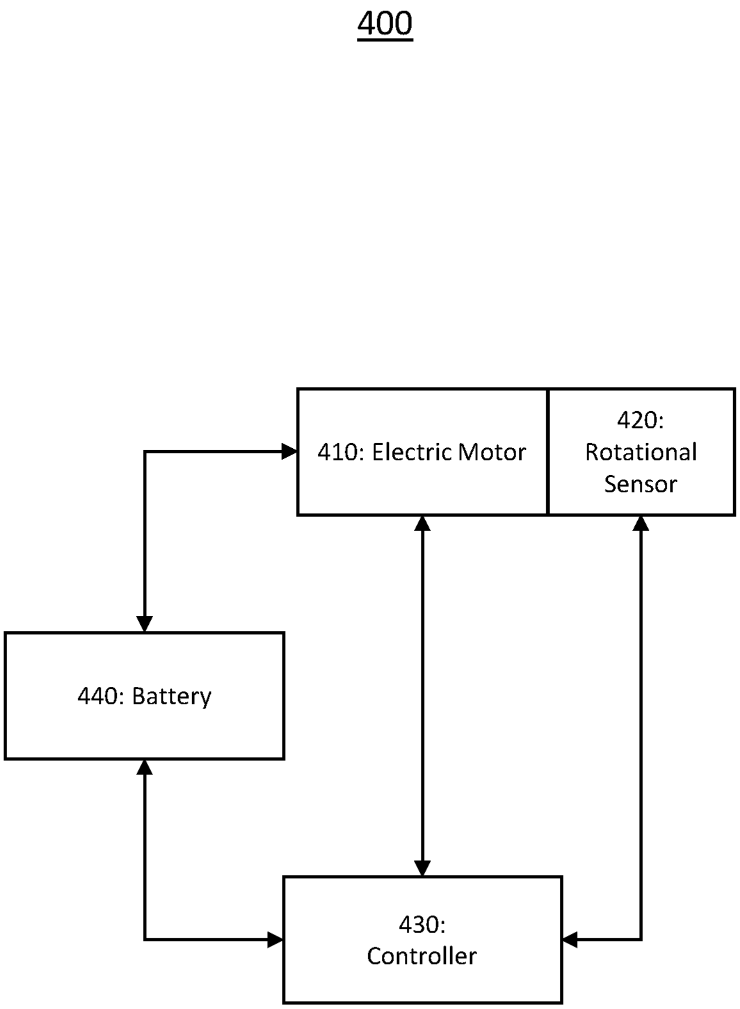
FIG. 4 illustrates another exemplary system for regulating a turbocharger rotational speed according to an exemplary embodiments of the present disclosure.

Turning now to FIG. 4, an exemplary system 400 for controlling a rotational speed of a turbocharger is shown. The exemplary turbocharger control system 400 can include a rotational sensor 420, an electric motor 410, a battery 440 and a controller 430. The exemplary system is configured for maintaining a constant rotational speed of a turbocharger assembly including a turbine, a compressor, and a shaft.

The controller 430 can be configured to monitor a rotational speed of a turbocharger assembly using a rotational sensor 420. The rotational sensor can provide data indicative of the revolutions per minute of the shaft of the turbocharger assembly. In some exemplary embodiments, the rotational sensor 420 may be integral to the electric motor 410. The controller 430 is configured to regulate the rotational speed of the turbocharger assembly to prevent premature wear of the bearings and the like due to rotational speed variations. The controller 430 may control a current from vehicle board net or battery 440 to the electric motor 410 such that current is applied to the electric motor when the rotational speed of the turbocharger assembly is less than the desired rotational speed and a current is generated by the electric motor 410 when the rotational speed is greater than the desired rotational speed. In some exemplary embodiments, the controller 430 is providing a boost pressure target for the intake manifold pressure and controls the turbo shaft speed in response to the boost pressure target.

In some exemplary embodiments, the controller 430 may determine a desired rotational speed in response to a combustion engine throttle setting or other engine parameters. The controller 430 may then determine a current value in response to a difference between the desired rotational speed and a measured rotational speed. The controller 430 can generate a control signal indicative of the current value to control the current applied to the electric motor. The control signal may be coupled to a battery controller or may be coupled to the electric motor 410 or associated motor controller. In some exemplary embodiments, the current value may be determined in response to the desired rotational speed, the measured rotational speed and an estimated rotational speed estimated in response to the combustion engine load, engine speed, ambient conditions, and other performance characteristics.

In some exemplary embodiments, the current value may be stored on a memory communicatively coupled to the controller 430 where the current value is associated with desired rotational speeds, measured rotational speed, and differences between these two values. In addition, rate of change of the measured rotational speed can be used in determining the current value. These current values may be determined in response to a machine learning model generated by a machine learning algorithm. In some exemplary embodiments, the current value and current value variations can be stored in the memory. These stored values can be updated and associated with the desired rotational speeds, measured rotational speed, and differences between these two values.

The electric motor 410 can be used to apply either a rotational force to the turbocharger assembly shaft, or a damping force to the turbocharger rotational shaft. The rotational force is generated by applying a positive current to the electric motor 410 to induce the positive rotational force, thereby increasing the rotational speed of the turbocharger assembly. In addition, a damping force, or negative rotational force, may be applied to reduce the rotational speed of the shaft when the electric motor 410 is used as a generator to generate a current which can be used to recharge the battery 440. In some exemplary embodiments, the measured rotational speed may be determined from a number of rotational speed measurements determined at periodic time intervals to generate a rotational speed curve.

The rotational speed curve may then be used to determine periodic pressure fluctuation of the exhaust pressure. The current value can be a periodic current curve generated in response to the periodic pressure fluctuation. These current values associated with the exhaust pressure fluctuations can be stored on a memory. The controller 430 can then be configured to retrieve these current values from the memory in response to the exhaust pressure fluctuations and/or rotational speed fluctuations. The memory can further store information related to the crankshaft position, engine load, valve phasing and other system properties which can be received from the engine controller or the like.

In some exemplary embodiments, the system 400 may further include a pressure sensor for measuring an exhaust pressure in addition to the rotational sensor 420 for measuring a measured rotational speed of a turbocharger shaft. In some exemplary embodiments, the exhaust pressure may be estimated in response to a throttle setting, vehicle speed and other vehicle performance characteristics. The controller 430 may be then operative to generate a control signal indicative of a current value in response to the exhaust pressure, the measured rotational speed, and the desired rotational speed. The electric motor 410 is then configured to apply a rotational force to the turbocharger shaft and to apply a damping force to the turbocharger shaft in response to a control signal. In addition, the system 400 can include a battery 440, vehicle board network or direction connection to the vehicle alternator/generator, conductively coupled to the electric motor 410 such that the electric motor 410 is configured to control a drive current from the battery 440 in response to the control signal being indicative of the desired rotational speed being greater than the measured rotational speed. The electric motor 410 can be further configured to control a recharge current from the electric motor 410 to the battery 440 in response to the control signal being indicative of the desired rotational speed being less than the measured rotational speed. In some exemplary embodiments, the rotational speed is dictated by the boost demand. The turbo controller may then control the electric motor 410 to consume or provide electric power to the battery 440 to change the wastegate or VNT position. This would then result in a variation of the cycle average electric power over what the high frequency variation of damping/motoring would adjust around. This can enable the electric motor to be limited in power to avoid overheating.

Figure 5:
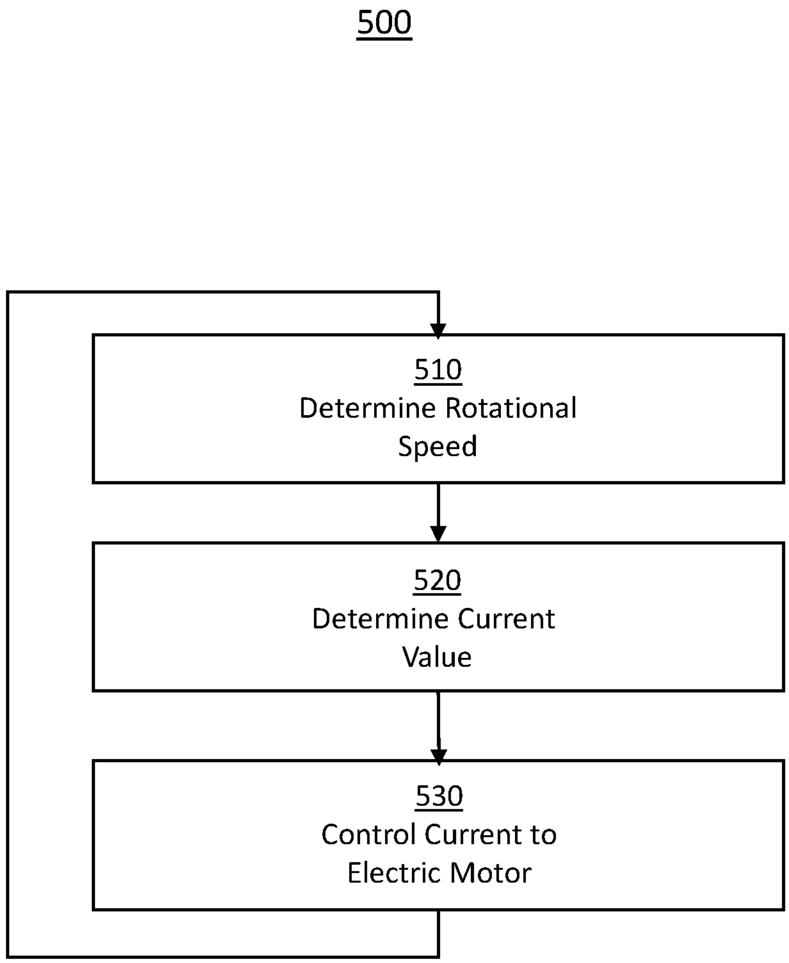
FIG. 5 illustrates another exemplary method for regulating a turbocharger rotational speed according to an exemplary embodiments of the present disclosure.

Turning now to FIG. 5, an exemplary method 500 for controlling a rotational speed of a turbocharger is shown. The method is first configured for determining 510 a rotational speed of a turbocharger assembly. The rotational speed of the turbocharger assembly may be determined by a rotational sensor coupled to the turbocharger assembly, or may be estimated in response to an exhaust pressure between a combustion engine and an exhaust turbine of the turbocharger assembly. The actual rotational speed of the turbocharger shaft can be determined in response to one or more of a detection of the rotational speed sensor, an exhaust pressure, throttle level, engine temperature and other combustion engine performance parameters The method is next operative to determine 520, by a processor or turbo controller, a current value in response to a difference between the predicted rotational speed and a desired turbocharger rotational speed. In some exemplary embodiments, the current value can be determined in response to the actual rotational speed as detected by the rotational sensor, an expected rotational speed as estimated in response to an exhaust pressure, and the desired rotational speed to maintain a consistent rotational speed. The current value can be determined in response to a machine learning algorithm trained by detecting a plurality of measured rotational speeds in response to a plurality of exhaust pressures. Different current levels may then be applied to an electric motor until a desired rotational speed is achieved for different combinations of measured rotational speeds and desired rotational speeds.

The method is next operative to control 530 a current corresponding to the current value to an electric motor to generate a rotational force on a turbocharger shaft. The current can be controlled by a turbo controller or a battery controller configured to control the current applied to the electric motor for applying a force to a shaft of the turbocharger assembly. In some exemplary embodiment, the current is coupled from the battery to the electric motor in response to a control signal from the turbo controller. The electric motor may be configured to apply a damping pressure, damping force or damping torque, to the turbocharger shaft in response to desired rotational speed being less than the expected rotational speed. In addition, the electric motor can be configured to generate current to charge the battery in response to the desired rotational speed being less than the expected rotational speed. The generating mode would induce a damping force on the turbocharger assembly to reduce the rate of rotation. In addition, waste gate variation, such as closing, can be employed to prevent the average turbo shaft speed dropping below the expected value.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment of the present disclosure. It is understood that various changes may be made in the function and arrangement of elements described in an exemplary embodiment without departing from the scope of the present disclosure as set forth in the appended claims.

What is claimed is:

1. A turbocharger control system comprising:

a turbocharger having an exhaust turbine and a centrifugal compressor mechanically coupled by a shaft;

a pressure sensor for detecting a series of boost pressure detections at regular time intervals, wherein the series of boost pressure detections is indicative of rotational speed fluctuations of the shaft;

an electric motor configured to apply a rotational force and a damping force to the shaft to reduce the rotational speed fluctuations in response to a current;

a processor configured to generate a pressure curve in response to the series of boost pressure detections, determine an expected rotational speed in response to the pressure curve, utilize a machine learning algorithm to determine a current value in response to a difference between the expected rotational speed and a desired rotational speed, wherein the current value is determined to maintain a constant rotational speed of the shaft, and to generate a control signal indicative of the current value to control the current applied to the electric motor; and a battery for supplying the current in response to the control signal being indicative of the expected rotational speed being less than the desired rotational speed and to receive the current from the electric motor in response to the control signal being indicative of the expected rotational speed being greater than the desired rotational speed wherein the current value is determined in response to a machine learning model generated by the machine learning algorithm, wherein the machine learning algorithm is configured to determine a required electric motor boost and a required damping to maintain a desired rotational speed of the shaft, and wherein deviations between an actual rotational speed and a predicted rotational speed are used as additional training data for the machine learning algorithm.

2. The turbocharger control system of claim 1 further including a rotational sensor configured to determine a rotational speed of the turbocharger and to output the rotational speed to the processor, wherein the processor is further configured to store the current value and the rotational speed in a memory.

3. The turbocharger control system of claim 1 further including a rotational sensor for detecting an actual rotational speed of the shaft and wherein the current value is determined in response to the actual rotational speed, the expected rotational speed, and the desired rotational speed.

4. The turbocharger control system of claim 1 wherein the pressure curve is generated in response to a plurality of intake pressure detections taken at periodic time intervals and the current value is generated in response to the pressure curve and wherein the current applied to the electric motor varies in response to the pressure curve.

5. The turbocharger control system of claim 1 time wherein the current is applied to the electric motor after a first time delay.

6. The turbocharger control system of claim 1 wherein a waste gate variation is employed in response to the control signal in order to prevent an average speed of the shaft from dropping below the expected rotational speed.

7. The turbocharger control system of claim 1 wherein the electric motor is further configured to apply the damping force to the shaft such that the electric motor generates a recharge current to recharge the battery.

8. The turbocharger control system of claim 1 wherein the pressure curve is generated in response to a plurality of intake pressure detections taken at periodic time intervals and wherein the processor is configured to determine a periodic pressure fluctuation of the boost pressure in response to the pressure curve and wherein the current value is generated in response to the periodic pressure fluctuation.

9. The turbocharger control system of claim 1 further including a memory for storing the current value associated with the boost pressure and wherein the processor is configured to retrieve the current value from the memory in response to the boost pressure.

10. A turbocharger control system comprising:

rotational sensor for measuring a measured rotational speed of a turbocharger shaft;

a pressure sensor for detecting a series of boost pressure detections at regular time intervals wherein the series of boost pressure detections is indicative of rotational speed fluctuations of the shaft;

an electric motor configured to apply a rotational force to the turbocharger shaft and to apply a damping force to the turbocharger shaft to reduce the rotational speed fluctuations in response to a control signal; and a processor operative to generate a pressure curve in response to the series of boost pressure detections, to determine an expected rotational speed in response to the pressure curve, to determine a current value using a machine learning algorithm, in response to a difference between the expected rotational speed and a desired rotational speed wherein the current value is determined to maintain a constant rotational speed of the shaft, and to generate the control signal indicative of a current; and a battery for supplying the current in response to the control signal being indicative of the expected rotational speed being less than the desired rotational speed and to receive the current from the electric motor in response to the control signal being indicative of the expected rotational speed being greater than the desired rotational speed wherein the processor is further configured to store the current value and the measured rotational speed in a memory, wherein the machine learning algorithm is configured to determine a required electric motor boost and a required damping to maintain a desired rotational speed of the shaft, and wherein deviations between an actual rotational speed and a predicted rotational speed are used as additional training data for the machine learning algorithm.

* * * * *